US011099708B2

(12) United States Patent
Nuber et al.

(10) Patent No.: US 11,099,708 B2
(45) Date of Patent: Aug. 24, 2021

(54) PATTERNS FOR LOCATIONS ON THREE-DIMENSIONAL OBJECTS

(71) Applicant: Hewlett-Packard Development Company, L.P., Spring, TX (US)

(72) Inventors: Nathan Barr Nuber, Fort Collins, CO (US); Steven Steinmark, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/756,166

(22) PCT Filed: Dec. 15, 2017

(86) PCT No.: PCT/US2017/066797
§ 371 (c)(1),
(2) Date: Apr. 15, 2020

(87) PCT Pub. No.: WO2019/117959
PCT Pub. Date: Jun. 20, 2019

(65) Prior Publication Data
US 2020/0301564 A1  Sep. 24, 2020

(51) Int. Cl.
*G06F 3/0481* (2013.01)
*G06F 3/0354* (2013.01)

(52) U.S. Cl.
CPC ........ *G06F 3/04815* (2013.01); *G06F 3/0354* (2013.01)

(58) Field of Classification Search
CPC .... G06T 19/006; G06F 3/011; G06F 3/04815; G06F 3/0304; G06F 3/03545; G02B 2027/0138
See application file for complete search history.

(56) References Cited

U.S. PATENT DOCUMENTS

| | | | |
|---|---|---|---|
| 8,547,346 B2 | 10/2013 | Yoshida | |
| 8,548,317 B2 | 10/2013 | Craven-Bartle | |
| 8,947,455 B2 * | 2/2015 | Friesen | G06F 3/011 345/633 |
| 9,128,537 B2 | 9/2015 | Song et al. | |
| 9,744,727 B2 | 8/2017 | Willis | |
| 2004/0190775 A1 | 9/2004 | Miller | |
| 2006/0285755 A1 | 12/2006 | Hager et al. | |
| 2007/0031028 A1 | 2/2007 | Vetter et al. | |
| 2013/0141548 A1 * | 6/2013 | Tenn | G06T 7/49 348/50 |
| 2013/0215132 A1 | 8/2013 | Fong | |
| 2013/0218531 A1 | 8/2013 | Deichmann et al. | |
| 2015/0228123 A1 * | 8/2015 | Yasutake | G06T 19/006 345/633 |

(Continued)

OTHER PUBLICATIONS

Autodesk, Introduce to UV mapping, Sep. 2014 (8 pages).
(Continued)

*Primary Examiner* — Koosha Sharifi-Tafreshi
(74) *Attorney, Agent, or Firm* — Trop, Pruner & Kang

(57) ABSTRACT

In some examples, a system is to receive an input from an input device that senses a portion of a pattern on a three-dimensional (3D) object formed by 3D printing, map the sensed portion of the pattern onto a 3D location on the 3D object, and produce an output corresponding to the 3D location on the 3D object in response to the input.

20 Claims, 3 Drawing Sheets

(56) References Cited

U.S. PATENT DOCUMENTS

| | | | |
|---|---|---|---|
| 2015/0248785 A1* | 9/2015 | Holmquist | G06T 19/006 |
| | | | 345/419 |
| 2017/0140512 A1 | 5/2017 | Hemani et al. | |
| 2018/0188831 A1* | 7/2018 | Lyons | G06F 3/0304 |
| 2019/0065027 A1* | 2/2019 | Hauenstein | G06T 19/006 |

OTHER PUBLICATIONS

Intelliglobe II Deluxe Interactive Globe for Kids downloaded Nov. 3, 2017 (7 pages).

Liao, C et al., Evaluating and Understanding the Usability of a Pen-based Command System for Interactive Paper, Mar. 2012, https://www.cs.cornell.edu/~francois/Papers/PapierCraft_Eval.pdf.

OID (Optical ID) and codes, downloaded Nov. 3, 2017 (3 pages).

Wikipedia, UV mapping last edited Jul. 2, 2017 (2 pages).

\* cited by examiner

US 11,099,708 B2

PATTERNS FOR LOCATIONS ON THREE-DIMENSIONAL OBJECTS

BACKGROUND

Various types of input devices can be used by users to make inputs at electronic devices. Examples of input devices include keyboards, pointing devices (e.g., mouse devices, joysticks, track pads), touch-sensitive display screens, digital pens, and so forth. In some cases, inputs made by a user can be with respect to an object that is displayed in a display device.

BRIEF DESCRIPTION OF THE DRAWINGS

Some implementations of the present disclosure are described with respect to the following figures.

Figure 1:
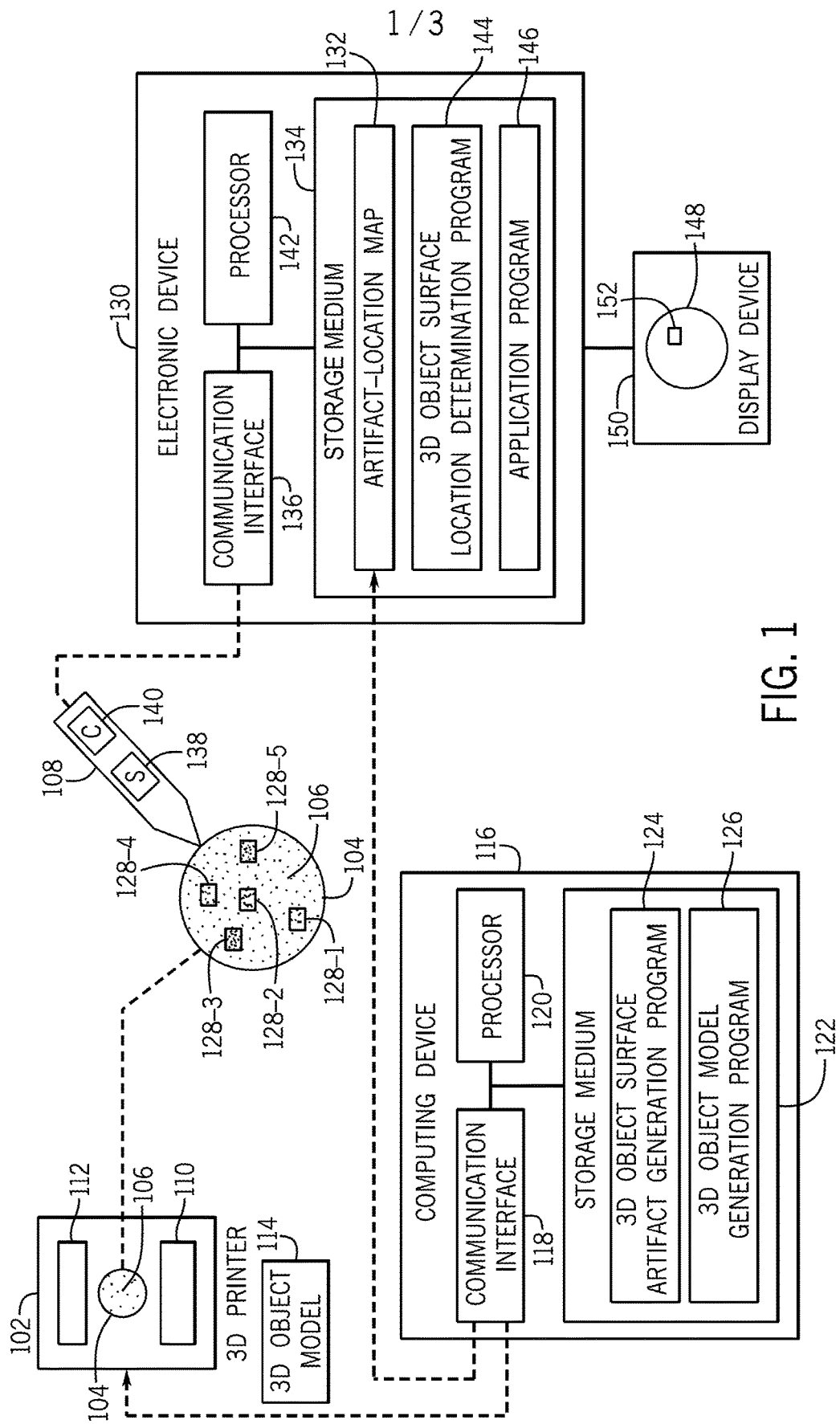
FIG. 1 is a block diagram of an arrangement that includes a three-dimensional (3D) printer, a computing device, a physical 3D object formed by the 3D printer, an input device, and an electronic device, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A three-dimensional (3D) representation of an object can be displayed in a display device. In some systems, a displayed 3D representation of an object can be manipulated based on user input. In such systems, the user input can be received through a two-dimensional (2D) surface, such as a 2D viewport on a display device, or a 2D touch-sensitive surface such as a touch-sensitive display screen or a touch-sensitive mat. A 2D viewport on a display device refers to a planar area of the display device in which an object (or multiple objects) is (are) displayed. A 2D touch-sensitive surface refers to a surface that is generally planar and that maps a user touch input to a 2D coordinate space.

With a 2D viewport on a display device, a user can manipulate an input device such as a pointing device (e.g., a mouse device, a joystick, a track pad, etc.) or another type of input device, to select a part of the displayed 3D object representation. Alternatively, if a 2D touch-sensitive display screen is used, then a user can select a part of the displayed 3D object representation by touching a location on the 2D surface of the touch-sensitive display screen. In examples where a touch-sensitive mat is used, a user can touch a location on the 2D surface of the touch-sensitive mat to select a part of the displayed 3D object representation.

Manipulating a displayed 3D object representation using a 2D input (such as any of those discussed above) does not allow for precise selection of a 3D location on the displayed 3D object representation. For example, when a user makes a 2D input, there can be ambiguity regarding the depth of the 3D object representation intended to be selected by the input. Thus, a user interaction with the displayed 3D object representation can be unnatural, non-intuitive, and imprecise (e.g., an input may be associated with multiple different possible interpretations).

In accordance with some implementations of the present disclosure, instead of interacting with a 3D object using a 2D input structure (e.g., using an input device when viewing a displayed 3D object representation in a 2D viewport of a display device, or interacting with a 2D input surface), a user can select portions of an actual physical 3D object using an input device that is able to sense a pattern formed on the physical 3D object. The physical 3D object is a real-world object that actually exists and with which a user can interact physically.

FIG. 1 is a block diagram of an example arrangement according to some implementations. FIG. 1 shows a 3D printer 102 that is used to form a physical 3D object 104. As shown in FIG. 1, the physical 3D object 104 formed by the 3D printer 102 includes a pattern of artifacts 106 formed on the exterior surface of the physical 3D object 104.

The pattern of artifacts 106 formed on the physical 3D object 104 can include any pattern of artifacts that can allow for different locations on the exterior surface of the physical 3D object 104 to be uniquely identified. For example, the pattern can include a pattern of dots formed on the exterior surface of the physical 3D object 104. In other examples, the pattern can include any other pattern of detectable artifacts that can be sensed by an input device 108. The pattern of artifacts 106 can either be visible to a human eye (e.g., formed with visible ink) or invisible to the human eye (e.g., formed with infrared or ultraviolet ink).

The 3D printer 102 forms the physical 3D object 104 by depositing successive layers of build material onto a build platform 110 in the 3D printer 102. A layer of build material can be delivered by the 3D printer 102 onto the build platform 110. A printhead 112 of the 3D printer 102 can then dispense a printing agent onto each layer of build material provided onto the build platform 110. Printing agents dispensed by the printhead 112 can include ink, as well as agents used to fuse powders of a layer of build material, detail a layer of build material (such as by defining edges or shapes of the layer of build material), and/or to perform other manipulations or modifications of a layer of build material.

The formation of the physical 3D object 104 by the 3D printer 102 is based on a 3D object model 114 produced by a computing device 116. The computing device 116 can be implemented using a single computer or an arrangement of multiple computers.

The 3D object model 114 is a representation of the physical 3D object 104 that is to be formed. The representation can include information regarding a material, a shape, a color, a pattern, and so forth, that is to be formed in various different portions of the physical 3D object 104.

The computing device 116 includes a communication interface 118 to communicate over a communication link with the 3D printer 102. The communication interface 118 can perform wired communication or wireless communication, either over a wired link or wireless link, respectively. The communication interface 118 can include a transceiver to transmit and receive signals over the communication link.

The computing device 116 further includes a processor 120, and a storage medium 122. A processor can refer to any or some combination of the following: a microprocessor, a core of a multi-core microprocessor, a microcontroller, a programmable integrated circuit, a programmable gate array, or another hardware processing circuit.

The storage medium 122 stores a 3D object surface artifact generation program 124 and a 3D object model generation program 126. The programs 124 and 126 are implemented as machine-readable instructions executable on the processor 120. Machine-readable instructions executable on a processor can refer to machine-readable instructions executable on a single processor or on multiple processors.

The 3D object model generation program 126 generates the 3D object model 114 that is to be provided to the 3D printer 102. The 3D object surface artifact generation program 124 generates the pattern of artifacts 106 that is to be formed on the exterior surface of the physical 3D object 104. This pattern of artifacts can be provided by the 3D object surface artifact generation program 124 to the 3D object model generation program 126 to be included as part of the 3D object model 114.

In addition, the 3D object surface artifact generation program 124 can generate an artifact-location map, which includes mapping information to map the artifacts of the pattern of artifacts 106 to respective 3D locations on the surface of the physical 3D object 106 printed by the 3D printer 102 using the 3D object model. The artifact-location map can be transmitted by the communication interface 118 of the computing device 116 to an electronic device 130, which stores the artifact-location map as map 132 in a storage medium 134 of the electronic device 130. In further examples, the computing device 116 can transmit the artifact-location map to a storage device (e.g., a USB drive, a server, etc.), and the electronic device 130 can retrieve or copy the artifact-location map from such storage device.

The electronic device 130 can include any or some combination of the following: a tablet computer, a smartphone, a wearable device (e.g., a head-mounted device, a smart watch, smart eyeglasses, etc.), a game appliance, a computer in a vehicle, or any other type of electronic device.

The pattern of artifacts 106 can include multiple unique arrangements of artifacts. The artifact-location map 132 maps the multiple unique arrangements of artifacts of the pattern of artifacts 106 to respective locations on the exterior surface of the physical 3D object 104. For example, the artifact-location map 132 can be implemented as a lookup table or other mapping data structure. In some examples, the artifact-location map 132 can include multiple entries, where each entry maps a corresponding unique arrangement of artifacts to a 3D location on the physical 3D object 104. The 3D location indicated in each entry of the artifact-location map 132 can be in the form of a 3D coordinate in a 3D coordinate space (e.g., x, y, z coordinate space), for example.

Several blocks 128-1, 128-2, 128-3, 128-4, and 128-5 are drawn onto the pattern of artifacts 106 shown in FIG. 1. Note that the blocks 128-1 to 128-5 are not actually formed on the exterior surface of the physical 3D object 104, but rather are shown in FIG. 1 for discussion purposes.

Each block 128-1 to 128-5 includes a unique arrangement of artifacts of the pattern of artifacts 106. Thus, the block 128-1 includes a first unique arrangement of artifacts (e.g., a first unique subset of dots), the block 128-2 includes a second unique arrangement of artifacts (e.g., a second unique subset of dots), the block 128-3 includes a third unique arrangement of artifacts (e.g., a third unique subset of dots), the block 128-4 includes a fourth unique arrangement of the artifacts (e.g., a fourth unique subset of dots), and the block 128-5 includes a fifth unique arrangement of artifacts (e.g., a fifth unique subset of dots), where the corresponding unique arrangements of artifacts are different from one another.

For example, the first unique arrangement of artifacts of the block 128-1 would be mapped to a first location on the physical 3D object 104, the second unique arrangement of artifacts of the block 128-2 would be mapped to a second, different location on the physical 3D object 104, and so forth. More generally, the artifact-location map 132 maps each unique arrangement of artifacts to a respective different location on the physical 3D object 104.

Although each block 128-1 to 128-5 is represented as a rectangle, it is noted that a block can have a different shape (e.g., a circle, an oval, etc.), depending on how the input device 108 is able to sense a small area on the exterior surface of the physical 3D object 104.

Also, although FIG. 1 shows blocks 128-1 to 128-5 that are spaced apart from one another with gaps between the blocks, it is noted that in actuality, contiguous blocks would be defined, where the contiguous blocks include the respective unique arrangements of artifacts.

The electronic device 130 includes a communication interface 136 to communicate with the computing device 116 and the input device 106 over a respective communication link. For example, the communication link can include a wireless link, such as a Bluetooth link, a Wi-Fi link, and so forth. In other examples, communication between the electronic device 130 with the input device 108 or the computing device 116 can be over a wired link.

The input device 108 can include a digital pen that has a sensor 138 to capture a block of artifacts, such as any or some combination of the blocks 128-1 to 128-5 or other blocks of artifacts, based on where the digital pen 108 is placed in contact with or in specified proximity with the exterior surface of the physical 3D object 104. For example, if the input device 108 is an electro-optical pen, the sensor 138 can include an optical sensor to capture an image of a block of artifacts (or blocks of artifacts) on the physical 3D object 104. A specified proximity of the digital pen 108 with the exterior surface of the 3D physical object 104 can refer to a proximity where the distance between a tip of the digital pen 108 and the exterior surface of the physical 3D object 104 is less than some threshold distance.

The electronic device 130 also includes a processor 142. The storage medium 134 of the electronic device 130 includes a 3D object surface location determination program 144 and an application program 146. The programs 144 and 146 are implemented as machine-readable instructions executable on the processor 142.

The 3D object surface location determination program 144 is executable on the processor 142 to determine a 3D location on the physical 3D object 104 based on a unique arrangement of artifacts captured by the digital pen 108. The 3D object surface location determination program 144 receives a representation (e.g., a 2D image) of a unique arrangement of artifacts as captured by the sensor 138 of the digital pen 108 and accesses the artifact-location map 132 to retrieve an entry of the artifact-location map 132 that corresponds to the received unique arrangement of artifacts. The retrieved entry of the artifact-location map 132 maps the received unique arrangement of artifacts to a location on the physical 3D object 104.

In some examples, the mapping of the 2D image of artifacts to a 3D location can include UV mapping, which is a process of projecting a 2D image to a 3D model's surface. In other examples, other mapping techniques can be used.

The 3D location determined by the 3D object surface location determination program 144 in response to the received unique arrangement of artifacts as captured by the digital pen 108 can be provided to the application program 146. The application program 146 is executable on the processor 142 to use the determined location to perform a manipulation of a 3D object, where the 3D object manipulated can be a displayed 3D object 148 as displayed by a display device 150. For example, the application program 146 can be a computer-aided design (CAD) application program that can make a modification of a portion of the displayed 3D object 148 at the corresponding location, which is represented as 152 in FIG. 1. The modification can include adding or changing a color, adding or changing a texture, adding or changing a shape, or any other manipulation at the location 152 on the displayed 3D object 148. The display device 150 can be part of the electronic device 130 or can be separate from the electronic device 130.

The various devices of FIG. 1, including the computing device 116, the 3D printer 102, the digital pen 108, and the electronic device 130, can be owned by and/or operated by different entities. For example, the digital pen 108 and the electronic device 130 may be owned by and/or operated by an end user. The 3D printer 102 may be owned by and/or operated by the end user, or by an upstream entity such as a manufacturer of physical 3D objects. The computing device 116 can be owned by and/or operated by the end user, or by an upstream entity that can be the same entity that owns and/or operates the 3D printer 102, or a different entity.

In further examples, a user can manipulate the displayed 3D object 148 while viewing the displayed 3D object 148. For example, the user may select a point on the 3D surface of the physical 3D object 104 with the digital pen 108, and the user may use another input, such as with the user's second hand (e.g., a gesture, a mouse input, a key combination, another digital pen, etc.) to manipulate the view around the selected point (e.g., zoom into or out from that point, rotate about that point, center/rotate the view to position that point front and center, etc.). In other examples, the user can perform other manipulations of the displayed 3D object 148 while viewing the displayed 3D object 148.

Also, in some examples, if the user changes, e.g., the size or shape, the displayed 3D object 148, the displayed 3D object 148 may no longer match the physical 3D object 104. Accordingly, the artifact-location map 132 may have to be updated. For example, if the size of the displayed 3D object 148 is changed (increased or decreased), an update program in the electronic device 130 or the computing device 116 can update the artifact-location map 132 by adding information mapping between a 3D location on the physical 3D object 104 and a 3D location on the displayed 3D object 148. In other examples, instead of updating the artifact-location map 132, the update program can add the mapping information to another mapping data structure that maps between 3D locations on the physical 3D object 104 and the displayed 3D object 148. In further examples where the shape of the displayed 3D object 148 is changed, then the update program may add information mapping locations of regions of the displayed 3D object 148 that have changed to corresponding locations on the physical 3D object 104. The added mapping information (whether to the artifact-location map 132 or to another mapping data structure) can be used to transform a location on the physical 3D object 104 to a location on the modified displayed 3D object 148.

Figure 2:
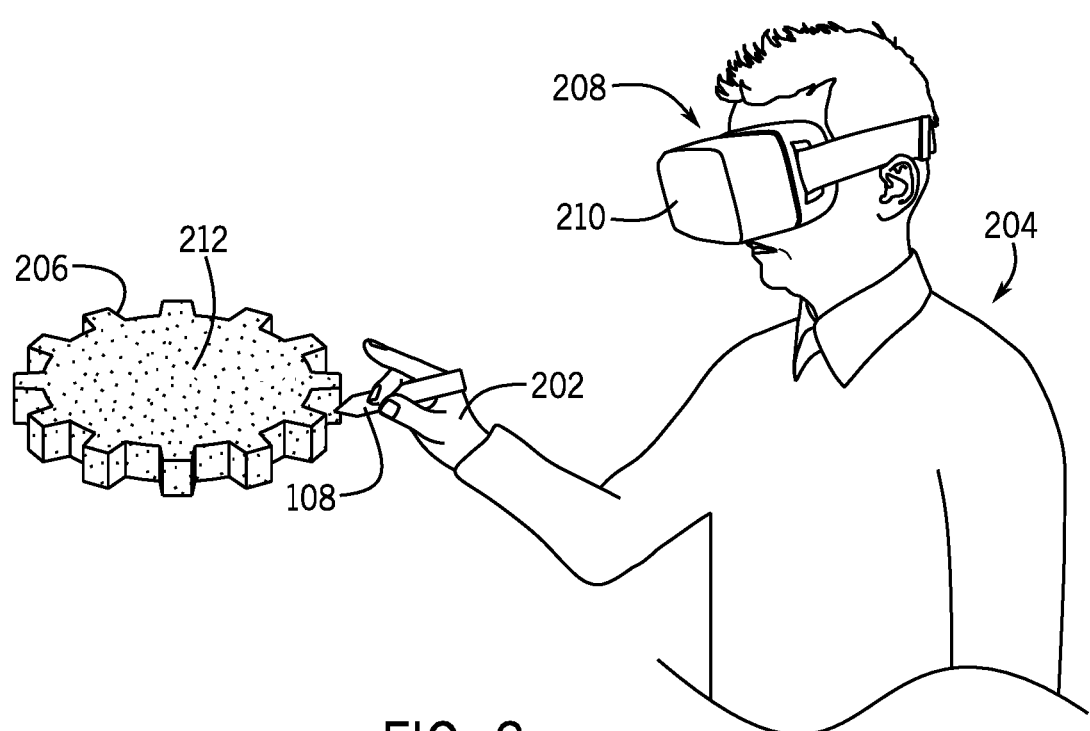
FIG. 2 illustrates an arrangement that includes an input device, a head-mounted device, and a physical 3D object, according to further examples.

FIG. 2 is a block diagram of another example arrangement that includes the digital pen 108, which is held by a hand 202 of a user 204. The arrangement of FIG. 2 also includes a physical 3D object 206, which may be formed by a 3D printer, such as the 3D printer 102 of FIG. 1. In addition, the arrangement of FIG. 2 includes a head mounted device 208, which includes a display device 210 and associated electronic components, such as a communication interface, a processor, and a storage medium. The head-mounted device 208 is an example of the electronic device 130 shown in FIG. 1. Alternatively, the electronic device 130 can be a computer in communication with the head-mounted device 208.

A pattern of artifacts 212 can be formed onto the various exterior surfaces of the physical 3D object 206. The pattern of artifacts 212 include respective unique arrangements of artifacts at respective different areas of the exterior surfaces of the physical 3D object 204. The digital pen 108 can communicate with the head-mounted device 208. Based on a captured unique arrangement of artifacts by the digital pen 108, the head-mounted device 208 can map the captured unique arrangement of artifacts to a corresponding 3D location on the physical 3D object 206, and a program (e.g., the application program 146 of FIG. 1) executing in the head-mounted device 208 can perform a manipulation at the corresponding location in a displayed 3D object in the display device 210 of the head-mounted device 208.

Figure 3:
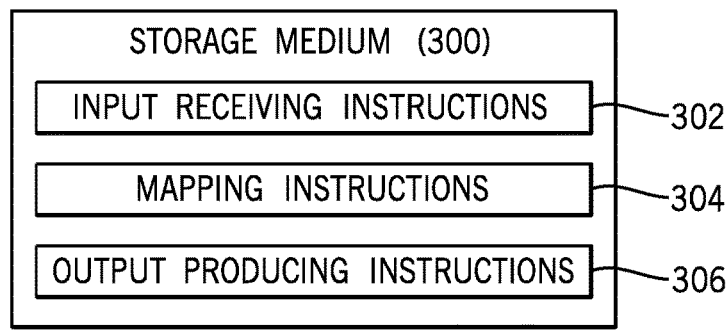
FIG. 3 is a block diagram of a storage medium storing machine-readable instructions according to other examples.

FIG. 3 is a block diagram of a non-transitory machine-readable or computer-readable storage medium 300 storing machine-readable instructions that upon execution cause a system to perform various tasks. For example, the system can include the electronic device 130 of FIG. 1. The machine-readable instructions include input receiving instructions 302 to receive an input from an input device (e.g., 108 in FIG. 1 or 2) that senses a portion of a pattern on a 3D object formed by 3D printing (such as with the 3D printer 102 of FIG. 1). The input can include a 2D representation of the portion of the pattern on the 3D object.

The machine-readable instructions further include mapping instructions 304 to map the sensed portion of the pattern onto a 3D location on the 3D object, such as by accessing the artifact-location map 132 of FIG. 1.

The machine-readable instructions further include output producing instructions 306 to produce an output corresponding to the 3D location on the 3D object in response to the input. The producing of the output includes assigning a visual attribute to the 3D location on the 3D object, where the visual attribute is selected from among a color, a texture, a material, a shape, and a size, as examples. In further examples, the producing of the output is part of generating a 3D image of the 3D object for display in a display device, such as for a virtual reality presentation or an augmented reality presentation in the display device. A virtual reality presentation displays objects that are virtual representations of real world objects. An augmented reality presentation displays both objects that are virtual representations of real world objects and captured images (as captured by cameras, for example) of real world objects.

Figure 4:
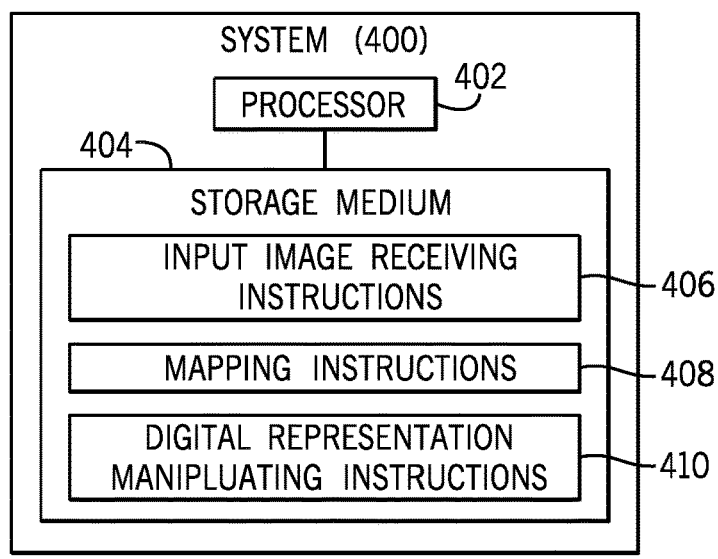
FIG. 4 is a block diagram of a system according to yet further examples.

FIG. 4 is a block diagram of a system 400 that includes a processor 402, and a storage medium 404 storing machine-readable instructions executable on the processor 402 to perform various tasks. The machine-readable instructions include input image receiving instructions 406 to receive an input image from an optical sensor of an input device, the input image comprising a portion of a pattern on a 3D object formed by 3D printing by a 3D printer. The machine-readable instructions further include mapping instructions 408 to map the portion of the pattern in the input image onto a 3D location on the 3D object. In addition, the machine-readable instructions further include digital representation manipulating instructions 410 to manipulate a digital representation of the 3D object at the 3D location.

Figure 5:
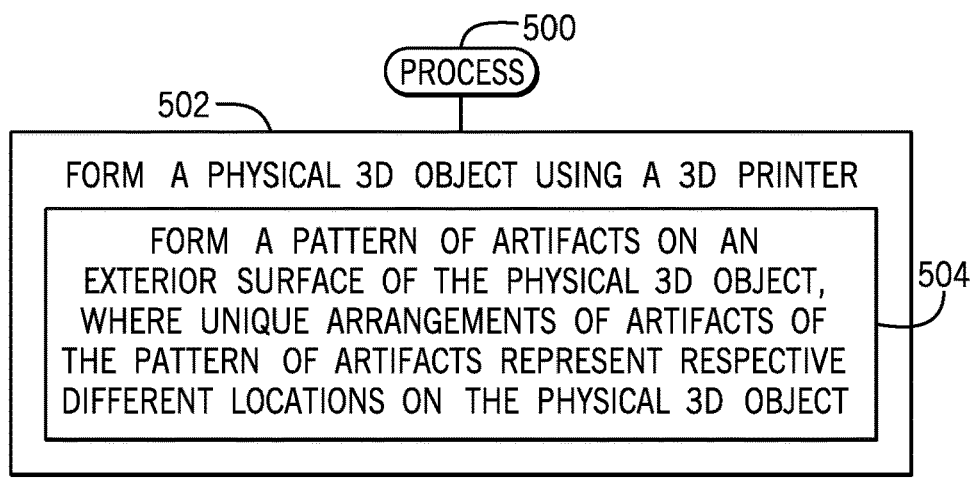
FIG. 5 is a flow diagram of a process according to some examples.

FIG. 5 is a flow diagram of a process 500 according to further examples. The process 500 includes forming (at 502) a physical 3D object using a 3D printer (e.g., 102 in FIG. 1). The forming of the physical 3D object includes forming (at 504) a pattern of artifacts on an exterior surface of the physical 3D object, where the pattern of artifacts includes a plurality of unique arrangements of artifacts, and each unique arrangements of artifacts of the plurality of unique arrangements of artifacts represents a respective different location on the physical 3D object. The plurality of unique arrangements of artifacts are optically detectable by an optical sensor of an input device.

In further examples, a map (e.g., 132 in FIG. 1) is generated that maps the unique arrangements of artifacts of the plurality of unique arrangements of artifacts to the respective different locations on the physical 3D object. The map is provided to a program (e.g., 144 in FIG. 1) that processes an input from the input device to manipulate a representation of the physical 3D object at the location on the physical 3D object mapped to the input.

The storage medium 122 or 134 of FIG. 1, the storage medium 300 of FIG. 3, or the storage medium 404 of FIG. 4, can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium storing instructions that upon execution cause a system to:

receive an input from an input device that senses a portion of a pattern on a three-dimensional (3D) object formed by 3D printing;

access stored mapping information that correlates different portions of the pattern on the 3D object to respective different 3D locations on the 3D object;

map, using the stored mapping information, the sensed portion of the pattern onto a 3D location on the 3D object, the 3D location being one of the different 3D locations in the stored mapping information; and produce an output corresponding to the 3D location on the 3D object in response to the input.

2. The non-transitory machine-readable storage medium of claim 1, wherein the input comprises a two-dimensional (2D) representation of the sensed portion of the pattern, and the mapping maps the 2D representation to the 3D location.

3. The non-transitory machine-readable storage medium of claim 1, wherein the pattern on the 3D object comprises a pattern of dots, and the input comprises a subset of the dots of the pattern of dots, and wherein the mapping maps the subset of the dots of the pattern of dots to the 3D location.

4. The non-transitory machine-readable storage medium of claim 1, wherein the pattern on the 3D object comprises a pattern of artifacts, wherein the pattern of artifacts includes a plurality of unique arrangements of artifacts, each unique arrangements of artifacts of the plurality of unique arrangements of artifacts representing a respective different location on the 3D object, and wherein the input comprises a representation of one of the plurality of unique arrangements of artifacts, and the mapping maps the one of the plurality of unique arrangements of artifacts to the 3D location on the 3D object.

5. The non-transitory machine-readable storage medium of claim 4, wherein the pattern of artifacts is in a 3D space, and the representation of one of the plurality of unique arrangements of artifacts is in a 2D space.

6. The non-transitory machine-readable storage medium of claim 1, wherein the producing of the output comprises assigning a visual attribute to the 3D location, the visual attribute selected from among a color, a texture, a material, a shape, and a size.

7. The non-transitory machine-readable storage medium of claim 1, wherein the producing of the output is part of generating a 3D image of the 3D object for display in a display device.

8. The non-transitory machine-readable storage medium of claim 7, wherein the generating of the 3D image of the 3D object is part of generating the 3D image for a virtual reality presentation or an augmented reality presentation in the display device.

9. The non-transitory machine-readable storage medium of claim 7, wherein the input from the input device comprises an image captured by an optical sensor of the input device and is received based on user manipulation of the 3D object while viewing the 3D image.

10. The non-transitory machine-readable storage medium of claim 9, wherein the instructions upon execution cause the system to:

update the stored mapping information in response to changing a size or a shape of the 3D image responsive to the user manipulation.

11. A system comprising:

a processor; and a non-transitory storage medium storing instructions executable on the processor to:

receive an input image from an optical sensor of an input device, the input image comprising a portion of a pattern on a three-dimensional (3D) object formed by 3D printing by a 3D printer;

access mapping information that correlates different portions of the pattern on the 3D object to respective different 3D locations on the 3D object;

map, using the mapping information stored in the non-transitory storage medium, the portion of the pattern in the input image onto a 3D location on the 3D object, the 3D location being one of the different 3D locations in the mapping information; and manipulate a digital representation of the 3D object at the 3D location.

12. The system of claim 11, wherein the input image comprising the portion of the pattern is a 2D image, and the mapping maps the 2D image to the 3D location on the 3D object.

13. The system of claim 12, wherein the 2D image is in a 2D coordinate space, and the 3D location on the 3D object is in a 3D coordinate space.

14. A method comprising:

generating, by a system comprising a hardware processor, mapping information that maps a plurality of unique arrangements of artifacts to respective different three dimensional (3D) locations on a physical 3D object; and providing, by the system, the mapping information to a program that processes an input from an input device to manipulate a representation of the physical 3D object at a 3D location on the physical 3D object mapped to the input by the mapping information.

15. The non-transitory machine-readable storage medium of claim 1, wherein the different 3D locations in the stored mapping information are expressed as 3D coordinates in the mapping information.

16. The non-transitory machine-readable storage medium of claim 15, wherein the pattern comprises a plurality of unique arrangements of artifacts, and wherein the stored mapping information comprises multiple entries, each entry of the multiple entries correlating a respective unique arrangement of artifacts to a 3D coordinate of the 3D coordinates.

17. The system of claim 11, wherein the different 3D locations in the mapping information are expressed as 3D coordinates in the mapping information.

18. The system of claim 17, wherein the pattern comprises a plurality of unique arrangements of artifacts, wherein the input image comprises a representation of unique arrangement of artifacts of the plurality of unique arrangements of artifacts, and wherein the mapping information comprises multiple entries, each entry of the multiple entries correlating a respective unique arrangement of artifacts to a 3D coordinate of the 3D coordinates.

19. The system of claim 11, wherein the input image comprises a two-dimensional (2D) representation of the portion of the pattern, and the mapping maps the 2D representation to the 3D location.

20. The method of claim 14, wherein the plurality of unique arrangements of artifacts comprise a plurality of unique arrangements of dots.

* * * * *